United States Patent Office 3,116,330
Patented Dec. 31, 1963

3,116,330
N-AMINOPHENYLETHYL-2,2-DIPHENYL-ALKYLAMINES
Walter Krohs, Bad Soden, Taunus, and Karl Schmitt, Leopold Ther, and Ernst Lindner, Frankfurt am Main, Germany, assignors to Farbwerke Hoechst Aktiengesellschaft vormals Meister Lucius & Brüning, Frankfurt am Main, Germany, a corporation of Germany
No Drawing. Filed Oct. 19, 1959, Ser. No. 847,068
5 Claims. (Cl. 260—570)

The present invention provides substituted phenylethylamines of the general formula:

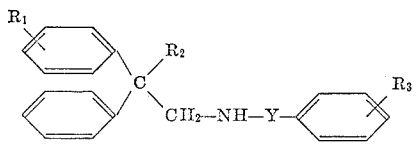

wherein $R_1$ represents a hydrogen atom or a low molecular weight alkyl radical, $R_2$ an alkyl radical containing from 2 to 4 carbon atoms, a cycloalkyl radical, a cycloalkylalkyl radical or a phenylalkyl radical, Y represents a straight chain alkylene group containing from 2 to 3 carbon atoms, and $R_3$ represents a hydrogen atom or the amino-group, and the acid addition salts of these substituted phenylethylamines, which are little toxic and possess strong neuroleptic and analgesic properties.

The invention also provides a process for making the above compounds, wherein an amine of the general formula

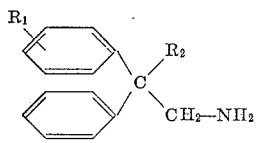

in which $R_1$ and $R_2$ have the meanings given above, is (a) reacted with a corresponding phenylalkyl halide or phenylalkylene halide or a corresponding sulfonic acid ester and, in case a phenylalkenyl halide or a correponding sulfonic acid ester is used, the double bond is saturated by hydrogenation,
(b) catalytically hydrogenated in the presence of an appropriate araliphatic aldehyde,
(c) first converted into Schiff type bases with the use of an appropriate araliphatic aldehyde, and the bases are subsequently hydrogenated,
(d) heated with an appropriate araliphatic alcohol in the presence of Raney-nickel,
(e) treated in the form of an appropriate phenylacyl compound with lithium-aluminum hydride, the nitro groups which may be present in the reaction products are reduced in the usual manner, and acylamino groups which may be present are converted into amino groups by conventional methods of saponification.

As starting materials there may be used, for example: 2,2 - diphenylbutylamine - (1), 2,2, - diphenyl - pentyl-amine - (1), 2,2 - diphenyl - hexylamine - (1), 2,2 - diphenyl - 3 - methyl - butylamine - (1), 2,2 - diphenyl - 3-methyl - pentylamine - (1), 2,2 - diphenyl - 4 - methyl-pentylamine - (1), 2,2 - diphenyl - 2 - cyclohexyl - ethyl-amine - (1), 2,2 - diphenyl - 3 - cyclohexyl - propylamine-(1), 2,2 - diphenyl - 3 - phenyl - propylamine - (1) or 2,2-diphenyl-4-phenyl-butylamine-(1).

The primary amines are obtained by catalytic hydrogenation of the corresponding acetonitriles in the presence of ammonia and a solvent, for example methanol, Raney nickel being advantageously used at a temperature of between 60° and 120° C. under a hydrogen pressure of between 50 and 100 atmospheres. The substituted acetonitriles specified can be obtained by known methods from the unsubstituted acetonitriles by reacting them with the corresponding halides as condensing agents using alkali metal amides or alkali metal hydrides in an inert solvent at a raised temperature.

The primary amino-group is alkylated in known manner, for example by reacting the amines with hydrohalic acid esters or sulfonic acid esters of an appropriate alcohol, hydrogenating the amines in the presence of an aldehyde, heating the amines with an alcohol and a nickel catalyst, for example Raney nickel, reacting the amines to obtain the corresponding acyl derivatives, and reducing these compounds with lithium-aluminum hydride.

The primary amines are advantageously alkylated with the aid of a phenylalkyl halide or phenylalkylene halide or a corresponding sulfonic acid ester by heating the reaction components in a solvent, for example ethanol, benzene, toluene, xylene, at a temperature of between 80° and 130° C. The time of heating depends on the reactivity of the ester component and the temperature used and generally varies between 2 and 20 hours. Thus, for example, the para-nitro-β-phenylethyl compounds are obtained by boiling the amines for 12 hours with 1-p-nitrophenyl-2-bromo-ethane in ethanol or benzene. In order to capture the hydrohalic acid formed during the reaction, it is advantageous to use two mols amine in a solvent immiscible with water. After the reaction has been terminated, the amine salt formed can be removed by filtering with suction or extracting the reaction solution with water, and the reaction product can be isolated either in the form of the free base by distilling off the solvent or in salt form by extracting the solvent with the aid of an acid.

To capture the acids formed, there may also be used in the place of the second mol of amine other basically reacting substances, for example sodium bicarbonate, anhydrous sodium carbonate or a tertiary amine, such as triethylamine or diethylaniline.

If sodium carbonate or sodium bicarbonate is used, it is advantageous to carry out the reaction while stirring well in a solvent immiscible with water, to remove the sodium salt formed after heating, and to process the reaction products in the manner described above. If a tertiary amine is used to capture the acids formed, a solvent miscible with water, for example ethanol, may also be used. In this case, the solvent is distilled off, the residue is taken up in water in order to dissolve the salts of the tertiary amines, and the reaction product is isolated by extracting it with the aid of a solvent immiscible with water. Alternatively, the alcoholic reaction solution may be immediately diluted with water, after cooling, until precipitation does no longer occur, and the reaction product is then processed in the manner described above.

The reaction may also be carried out in the absence of a solvent by heating the two reaction components at a temperature of between 80 and 130° C., 2 mols amine being advantageously used. To process the reaction mixture after cooling, it is taken up in a solvent immiscible with water, for example ether or benzene, and then treated in the manner described above.

As reaction components of the aforesaid amines there may be mentioned, for example, the following hydrohalic acid esters or sulfonic acid esters: 1-phenyl-2-bromo-ethane, 1-phenyl-3-bromo-propane, 1-p-nitrophenyl-2-bromo-ethane, 1-p-nitrophenyl-3-bromo-propane, 1-p-aceto-aminophenyl-2-bromo-ethane, cinnamyl chloride or the p-toluene-sulfonic acid ester of β-phenylethyl alcohol, preferably the corresponding methyl ester.

In the second variant of the process of this invention, i.e. the hydrogenation of the amines in the presence of an aldehyde, the following aldehydes may be used as starting materials: phenylacetaldehyde, p-nitrophenyl-acetaldehyde and cinnamic aldehyde.

The reaction can be carried out in one stage or two stages depending on whether the alkylidene compounds formed during the reaction of the amines with the aldehydes are first isolated or processed without being isolated. It is advantageous to carry out the reaction by dissolving the amine and the aldehyde in equimolecular amounts in an appropriate solvent, i.e. in alcohols of low molecular weight, for example methanol, and in one operation to immediately subject the reaction mixture obtained to catalytic hydrogenation. As catalysts there may advantageously be used the metals of group VIII of the periodic system, for example platinum, palladium, nickel or cobalt. If a noble metal catalyst is used, it is advantageous to use a reaction temperature of 40–50° C. at a slight superatmospheric pressure or under a pressure of up to 50 atmospheres, while it is recommended to use a temperature of 80–100° C. under a hydrogen pressure of 30–100 atmospheres in case base metals are used.

According to still another variant of the process of this invention the aforesaid primary amines are alkylated by heating in the presence of Raney nickel with an alcohol having a structure corresponding to the definition of the radical.

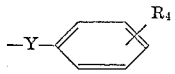

wherein $R_4$ represents a hydrogen atom, the nitro-group, the amino-group or an acylamino-group. Thus, for example, the N-β-phenylethyl-2,2-diphenyl-butylamine-(1) is obtained from 2,2-diphenyl-butylamine-(1) by heating it for 15 hours while stirring at 100–150° C. with an excess amount of β-phenylethyl alcohol in the presence of a great amount of Raney nickel.

The acyl compound of the amines of which the acyl radical likewise corresponds to the radical

can be converted into the alkyl compounds claimed by heating in an inert solvent with lithium-aluminum hydride. The acyl compounds which serve as starting materials can be prepared, for example by reacting the amines with the corresponding acid halides. The halides of the following acids, for example, may be used with advantage: phenylacetic acid, phenylpropionic acid, cinnamic acid, para-nitrophenylacetic acid.

If the reaction products contain groups that can be converted into amino-groups, for example nitro-groups or acylamino-groups, such groups can be converted into the amino-group in known manner, or more especially a nitro-group by catalytic hydrogenation and an acylamino-group by a conventional method of hydrolysis.

Aliphatic double bonds which may be contained in the reaction products can be hydrogenated in the usual manner. Thus, for example, the cinnamyl compounds can be catalytically hydrogenated using nickel or palladium as the catalyst to yield the γ-phenylpropyl compounds.

The novel products are little toxic and possess strong analgesic and neuroleptic activity of partially long duration. They possess, especially when orally administered a considerably stronger analgesic activity than 4-dimethyl-amino-1-phenyl-2,3-dimethylpyrazolone. As can be seen from the data indicated in the following table as regards their toxicity and analgesic activity, the chemotherapeutic index of three exemplary products obtained by the process of this invention is superior to that of the 1-methyl-4-phenylpiperidine-4-carboxylic acid ester for which the corresponding data are 300 mg./kg. ($LD_{50}$ p.o.) and 30 mg./kg. (analgesic activity p.o.).

| No. | Compound | Toxicity ($LD_{50}$) per os, mg./kg. | Analgesic activity per os, mg./kg. |
|---|---|---|---|
| 1 | N-p-amino-β-phenylethyl-2,2-diphenyl-butylamine-(1). | 500 | 25 |
| 2 | N-p-amino-β-phenylethyl-2,2-diphenyl-4-methyl-pentylamine-(1). | 2,000 | 100 |
| 3 | N-p-amino-β-phenylethyl-2,2-diphenyl-hexylamine-(1). | 2,000 | 100 |

The neuroleptic activity of the novel compounds was pharmacologically tested by the defense reaction of the gold hamster (cf. L. Ther et al., Arzneimittelforschung 9 (1959), page 351). The N-p-amino-β-phenyl-ethyl-2,2-diphenylbutylamine-(1), for example, was found to possess strong neutroleptic activity while the known 1-methyl-4-phenylpiperidine-4-carboxylic acid ethyl ester had no neuroleptic activity even when administered in high dosages. The good neuroleptic properties were also confirmed by the reaction of apes, cats, pidgeons and bettae splendentes.

The products can be converted into salts of intoxic inorganic or organic acids. Suitable acids are, for example, hydrochloric acid, hydrobromic acid, acetic acid, maleic acid or fumaric acid.

The following examples serve to illustrate the invention, but they are not intended to limit it thereto, the parts being by weight unless otherwise stated and the relationship of parts by weight to parts by volume being the same as that of the kilogram to the liter:

*Example 1*

(a) 45 parts 2,2-diphenyl-butylamine-(1), 100 parts by volume benzene and 23 parts para-nitro-β-phenylethyl bromide were heated to boiling for 12 hour. After cooling, the reaction mixture was extracted with water, the aqueous layer was separated from the benzene, and extracted with dilute hydrochloric acid. After some time, 32 parts N - p - nitro - β - phenylethyl-2,2-diphenyl-butyl-amine-hydrochloride crystallized out which was recrystallized from ethanol and then melted at 184° C. By hydrogenation with palladium or nickel as the catalyst in methanol, the hydrochloride of N-p-amino-β-phenylethyl-2,2-diphenyl-butylamine-(1) melting at 201° C. was obtained.

The same compound was obtained by catalytic hydrogenation of equimolecular amounts of 2,2-diphenyl-butyl-amine-(1) and p-nitrophenylacetaldehyde.

By analogous reaction of the amines with p-nitrophenylethyl-bromide and reduction of the nitro-group the following compounds were obtained:

(b) N-p-amino-β-phenylethyl - 2,2 - diphenylpentyl-amine-(1)-hydrochloride melting at 201° C. The 2,2-diphenylpentylamine-(1) boiling at 172° C. under a pressure of 6 mm. of mercury was obtained by hydrogenation from the diphenylpropylacetonitrile boiling at 168–170° C. under a pressure of 6 mm. of mercury.

(c) N-p-amino-β-phenylethyl - 2,2 - diphenyl - hexyl-amine-(1)-hydrochloride melting at 169° C. The 2,2-diphenyl-hexylamine-(1) boiling at 165–168° C. under a pressure of 6 mm. of mercury was obtained by hydrogenation from the diphenylbutylacetonitrile boiling at 163–167° C. under a pressure of 4 mm. of mercury.

(d) N-p-amino-β-phenylethyl-2,2-diphenyl - 4 - methyl-pentylamine-(1)-hydrochloride melting at 171° C. The 2,2-diphenyl-4-methyl-pentylamine-(1) boiling at 168° C. under a pressure of 5 mm. of mercury was obtained by hydrogenation from the diphenyl-isobutyl-acetonitrile boiling at 162–164° C. under a pressure of 5 mm. of mercury.

(e) N-p-amino-phenylethyl-2,2-diphenyl - 3 - methyl-pentylamine-(1)-hydrochloride melting at 213° C. The 2,2-diphenyl-3-methyl-pentylamine-(1) boiling at 167–168° C. under a pressure of 5 mm. of mercury was obtained from the diphenyl-sec-butylacetonitrile boiling at 167° C. under a pressure of 5 mm. of mercury.

(f) N-p-amino-β-phenylethyl-2,2-diphenyl - 3 - cyclohexylpropyl-amine-(1)-hydrochloride melting at 251° C. The 2,2-diphenyl-3-cyclohexyl-propylamine - (1) boiling at 185–187° C. under a pressure of 4 mm. of mercury was obtained by hydrogenation from the diphenylhexahydrobenzyl-acetonitrile boiling at 190–195° C. under a pressure of 4 mm. of mercury.

(g) N-p-amino-β-phenylethyl - 2,2,4 - triphenyl-butylamine-(1)-hydrochloride melting at 275° C. The 2,2-diphenyl-4-phenyl-butylamine-(1) melting at 90° C. was obtained by hydrogenation from the diphenylphenylethyl-acetonitrile melting at 101° C.

(h) N-p-amino-β-phenylethyl-2,2-diphenyl - 3 - methylbutylamine-(1)-hydrochloride melting at 235° C. The 2,2-diphenyl-3-methylbutylamine-(1) boiling at 158–160° C. under a pressure of 4 mm. of mercury was obtained from diphenyl-isopropylacetonitrile boiling at 148–152° C. under a pressure of 3 mm. of mercury.

*Example 2*

(a) 22.5 parts 2,2-diphenyl-butylamine-(1), 15.25 parts cinnamyl chloride, 10 parts triethylamine and 100 parts by volume benzene were heated and processed in the manner described in Example 1 and the N-cinnamyl-2,2 - diphenylbutylamine - (1) - hydrochloride melting at 221° C. was prepared. By hydrogenation of the double bond, the N-γ-phenylpropyl - 2,2 - diphenyl - butylamine-(1)-hydrochloride melting at 201° C. was obtained.

(b) In the manner described above, the 2,2-diphenyl-3-methylpentylamine-(1) was treated to yield the N-cinnamyl-2,2-diphenyl-3-methylpentylamine - (1) - hydrochloride melting at 121–124° C. (with decomposition) which was converted by hydrogenation into the N-γ-phenylpropyl-2,2-diphenyl-3-methyl-pentylamine - (1) hydrochloride melting at 190–191° C.

*Example 3*

(a) 22.5 parts 2,2-diphenyl-butylamine-(1) and 12 parts phenyl-acetaldehyde were hydrogenated at 40° C. in methanol using palladium as the catalyst. After termination of the hydrogen absorption, the reaction mixture was freed from the catalyst by filtration and the solvent was distilled off. The N-β-phenylethyl-2,2-diphenyl-butylamine which was obtained with a quantitative yield was converted into the hydrochloride which melted at 215° C. after recrystallization from acetone.

(b) The same compound could also be produced by heating the 2,2-diphenyl-butylamine-(1) for 15 hours at 100–150° C. with an excess of phenylethyl alcohol and a large amount of Raney-nickel, or (c) By reducing the phenacyl compound of 2,2-diphenyl-butylamine-(1) with lithiumaluminum hydride.

We claim:
1. A member of the group consisting of substituted phenylethylamines of the general formula

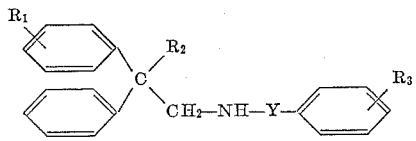

in which $R_1$ is a member of the group consisting of hydrogen and saturated alkyl radicals of low molecular weight, $R_2$ is a member of the group consisting of saturated alkyl radicals containing from 2 to 4 carbon atoms, inclusive, Y is a straight-chain alkylene group containing from 2 to 3 carbon atoms inclusive, and $R_3$ is amino.

2. The compound of the formula

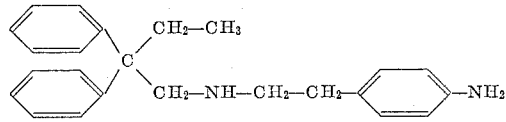

3. The compound of the formula

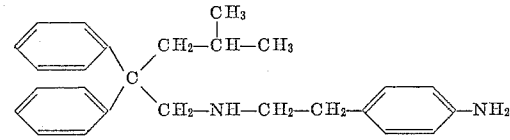

4. The compound of the formula

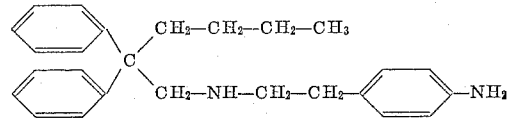

5. The compound of the formula

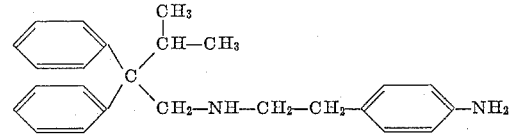

References Cited in the file of this patent
UNITED STATES PATENTS

| | | |
|---|---|---|
| 2,565,592 | Clark | Aug. 28, 1951 |
| 2,632,762 | Speeter | Mar. 24, 1953 |
| 2,738,347 | Bernstein et al. | Mar. 13, 1956 |

FOREIGN PATENTS

| | | |
|---|---|---|
| 1,017,612 | Germany | Oct. 17, 1957 |
| 1,058,063 | Germany | May 27, 1959 |

OTHER REFERENCES

Beilstein: Handbuch der organischen Chemie, volume 12, page 1344 (1929).

Buth et al.: Ber. Deut. Chem., volume 72, pages 18 to 28 (1939).

Edgerton et al.: J. Am. Pharm. Assoc., Sci. Ed., volume 48, pages 320–323 (1959).